(12) United States Patent
Mackie et al.

(10) Patent No.: US 9,145,776 B2
(45) Date of Patent: Sep. 29, 2015

(54) RETENTION DEVICE FOR A ROTATING BLADE

(75) Inventors: Kenneth J Mackie, Derby (GB); David M Beaven, Nottingham (GB)

(73) Assignee: ROLLS-ROYCE plc, London (GB)

( * ) Notice: Subject to any disclaimer, the term of this patent is extended or adjusted under 35 U.S.C. 154(b) by 597 days.

(21) Appl. No.: 13/483,460

(22) Filed: May 30, 2012

(65) Prior Publication Data
US 2012/0321476 A1 Dec. 20, 2012

(30) Foreign Application Priority Data

Jun. 14, 2011 (GB) .................................. 1109227.7
Aug. 10, 2011 (GB) .................................. 1113759.3

(51) Int. Cl.
| F01D 5/30 | (2006.01) |
| F01D 7/00 | (2006.01) |
| F01D 21/04 | (2006.01) |
| F02K 3/072 | (2006.01) |
| B64C 11/06 | (2006.01) |
| F02C 6/20 | (2006.01) |
| B64D 27/00 | (2006.01) |

(52) U.S. Cl.
CPC . *F01D 5/30* (2013.01); *B64C 11/06* (2013.01); *F01D 7/00* (2013.01); *F01D 21/045* (2013.01); *F02C 6/206* (2013.01); *F02K 3/072* (2013.01); *B64D 2027/005* (2013.01); *F05D 2260/36* (2013.01); *Y02T 50/66* (2013.01); *Y02T 50/672* (2013.01); *Y02T 50/673* (2013.01); *Y10T 29/49321* (2015.01)

(58) Field of Classification Search
CPC ............ F01D 5/30; F02C 6/206; B64C 11/06

USPC ........................ 416/220 R, 219 R, 204 R, 207
See application file for complete search history.

(56) References Cited

U.S. PATENT DOCUMENTS

| 5,263,898 A | 11/1993 | Elston, III et al. |
| 6,015,264 A * | 1/2000 | Violette et al. ............ 416/146 A |
| 2010/0215499 A1 | 8/2010 | Lafont |
| 2010/0239421 A1 | 9/2010 | Boston et al. |

FOREIGN PATENT DOCUMENTS

| EP | 0 822 137 A2 | 2/1998 |
| EP | 0 921 067 A2 | 6/1999 |
| EP | 2 009 246 A2 | 12/2008 |
| GB | 825 303 A | 12/1959 |
| WO | WO 99/08928 A1 | 2/1999 |

OTHER PUBLICATIONS

Oct. 1, 2014 Search Report issued in European Application No. 12 16 9972.
Dec. 2, 2011 British Search Report issued in British Patent Application No. GB1113759.3.

* cited by examiner

*Primary Examiner* — Dwayne J White
*Assistant Examiner* — Jason Fountain
(74) *Attorney, Agent, or Firm* — Oliff PLC

(57) ABSTRACT

A blade assembly including: a hub which is rotatable about an axis; at least one blade having an aerofoil portion and a root, wherein the root is coupled to the hub using a primary retention device which prevents radial separation of the root and hub in normal use; and, a secondary retention device having a root part and a hub part, the root part being located radially inwards of the hub part in a retention cavity in use, wherein at least a portion of the root part enters the retention cavity via an interlock which prevents radial separation of the root and hub in the event of a primary retention device failure.

17 Claims, 4 Drawing Sheets

RETENTION DEVICE FOR A ROTATING BLADE

This invention relates to a retention device for a rotating blade. In particular, the invention relates to a secondary retention device which provides a failsafe mechanism to help prevent release of a blade in the event of a failure of a primary retention device.

It is known to use a retention device on rotating blades, for example, on a propeller of an aircraft engine, to help prevent radial separation of the blades from the hub on which they are mounted. It is also known to use a secondary retention device which acts to prevent the radial separation of the blade and hub in the event of a failure of the primary retention device.

One known propeller assembly which utilises such a secondary retention device is shown in FIG. 1. The propeller assembly 10 comprises a hub 12 and a blade 14 having an aerofoil 16 and root 18. The blade 14 is configured to rotate about axis 19 with hub 12 on bearings (not shown) so as to provide a thrust in the direction indicated by arrow 21. Bearings 24 are provided such that the blade can be rotated about its longitudinal axis so as to provide a pitch control system. During manufacture of the propeller assembly 10, the root 18 is inserted into the hub 14 via an aperture 20 in the outer surface 22 of the hub 12 and the bearings 24 inserted between respective radially opposing faces 26, 28 of the hub 12 and root 18. The bearings 24 provide the rotational support required of the blade 14 and also act to prevent radial separation of the blade 14 and hub 12 during use. In this way, the bearings 24 act as a primary retention device.

The secondary retention device in the embodiment shown in FIG. 1 is a circular wire 32 which is fed into a channel formed from corresponding grooves in the facing surfaces of the hub 12 and the root 18. In the event of bearing failure, radial separation of the blade 14 and hub 12 is prevented by the wire.

Although the use of the wire 32 as a secondary retention device can be adequate, it relies on being correctly installed which requires a skilled operator and excessive amounts of time. Further, because the wire 32 is neither an integral part of the hub 12 nor the blade 14, it is subjected to relative movement between these components which can lead to vibration and wear problems. A further difficulty with this system arises due to the concealed location of the wire which makes inspection more troublesome.

The present invention seeks to overcome some of the problems with known prior art.

In a first aspect the present invention provides a blade assembly comprising: a hub which is rotatable about an axis; at least one blade having an aerofoil portion and a root, wherein the root is coupled to the hub using a primary retention device which prevents radial separation of the root and hub in normal use; and, a secondary retention device having a root part and a hub part, the root part being located radially inwards of the hub part in a retention cavity in use, wherein at least a portion of the root part enters the retention cavity via an interlock which prevents radial separation of the root and hub in the event of a primary retention device failure.

Providing an interlock for a part of the root to pass through so as to be retained within a retention cavity allows a simple and mechanically robust way of providing a retention device.

The interlock may comprise a retention aperture which overlaps a portion of the hub part when in normal use. The aperture may be substantially round. For example, the aperture may be circular or oval. The aperture may include one or more notch or projection in or on a circumferential edge. The root part may include one or more notches or projections. The notches and projections of the respective aperture and root part may correspond to provide the interlock. The interlock may include a passageway through which the one or more projection can pass. The passageway may be in the root part or the hub part.

The blade may have a longitudinal axis and the interlock may require the blade to be rotated approximately about the longitudinal axis of the blade to pass into the retention cavity via the interlock.

The passageway may include at least one key slot in the circumferential edge of the retention aperture and the root part may include a projection which corresponds to the key slot. There may be a plurality of key slots and corresponding projections. The key slots and projections may extend different arcuate lengths. There may be three key slots. The arcuate length of the key slots may be in the range between 20 degrees and 125 degrees.

The passageway may include at least two radially separated retention apertures and the root part may include at least two radially separated projections.

The radially separated projections may be axially aligned with respect to the longitudinal axis of the blade.

The radially separated projections may be axially asymmetrical so as to provide a distributed overlap between the projections and the respective retention apertures when in use.

The retention aperture may comprise a threaded portion which corresponds to a threaded portion on the root part.

The root part may be suspended within the retention cavity in normal use. Suspended may be taken to mean that the root part is separated from the retention aperture so as to not contact in normal use.

The interlock may be radially inwards of the primary retention device with respect to the rotational axis of the blade assembly. The interlock may be radially outwards of the primary retention device.

The primary retention feature is a bearing arrangement.

The separation of the root part and retention aperture in normal use may be less than 2.5 mm. The separation may be in the range bounded by the values 1 mm and 3 mm.

The blade assembly may be configured such that the primary retention device can only be engaged once the root part has entered the retention cavity via the interlock.

In a second aspect, the present invention provides a method of manufacturing a blade assembly comprising: a hub which is rotatable about an axis; at least one blade having an aerofoil portion and a root, wherein the root is coupled to the hub using a primary retention device which prevents radial separation of the root and hub in normal use; and, a secondary retention device having a root part and a hub part, the root part being located radially inwards of the hub part in a retention cavity in use, wherein at least a portion of the root part enters the retention cavity via an interlock which prevents radial separation of the root and hub in the event of a primary retention device failure, the method comprising the steps of: presenting the root part to the interlock; passing the root portion through the interlock so that it resides within the retention cavity in normal use; engaging a primary retention device.

Passing the root portion through the interlock may comprise rotating the root part about the approximate longitudinal axis of the blade.

Rotating the root portion may require a continuous rotation through at least one complete revolution.

Embodiments of the invention are described below with the aid of the following drawings in which.

Figure 2:
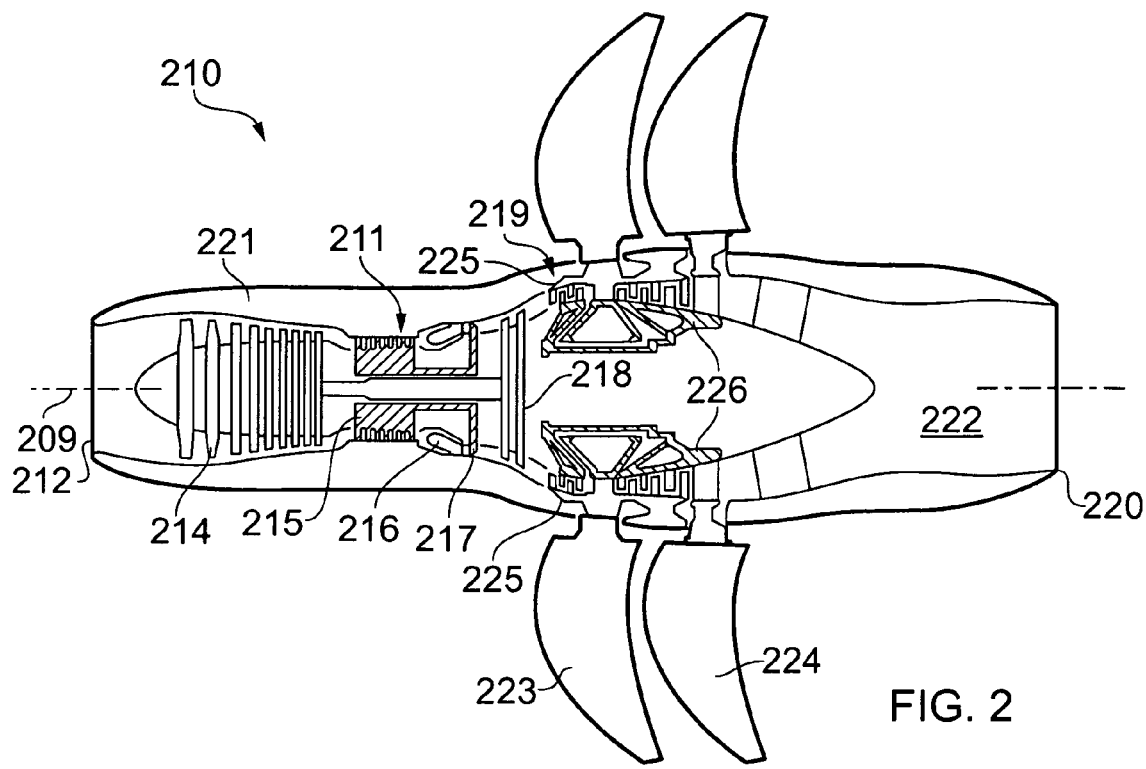
FIG. 2 shows a cross section of a known open rotor gas turbine engine in which the invention may be used.

Thus, FIG. 2 shows a twin-spooled, contra-rotating propeller gas turbine engine 210 having a principal and rotational axis 209. The engine 210 comprises a core engine 211 having, in axial flow series, an air intake 212, an intermediate pressure compressor 214 (IPC), a high-pressure compressor 215 (HPC), combustion equipment 216, a high-pressure turbine 217 (HPT), intermediate pressure turbine 218 (IPT), a free power turbine 219 (FPT) and a core exhaust nozzle 220. A nacelle 221 generally surrounds the core engine 211 and defines the intake 212 and nozzle 220 and a core exhaust duct 222. The engine 210 also comprises two contra-rotating propellers 223, 224 attached to and driven by the free power turbine 219, which comprises contra-rotating blade arrays 225, 226.

The gas turbine engine 210 works in a conventional manner so that air entering the intake 212 is accelerated and compressed by the IPC 214 and directed into the HPC 215 where further compression takes place. The compressed air exhausted from the HPC 215 is directed into the combustion equipment 216 where it is mixed with fuel and the mixture combusted. The resultant hot combustion products then expand through, and drive the high, low-pressure and free power turbines 217, 218, 219 before being exhausted through the nozzle 220 to provide some propulsive thrust. The high, low-pressure and free power turbines 217, 218, 219 respectively drive the high and intermediate pressure compressors 215, 214 and the propellers 223, 224 by suitable interconnecting shafts.

Figure 3:
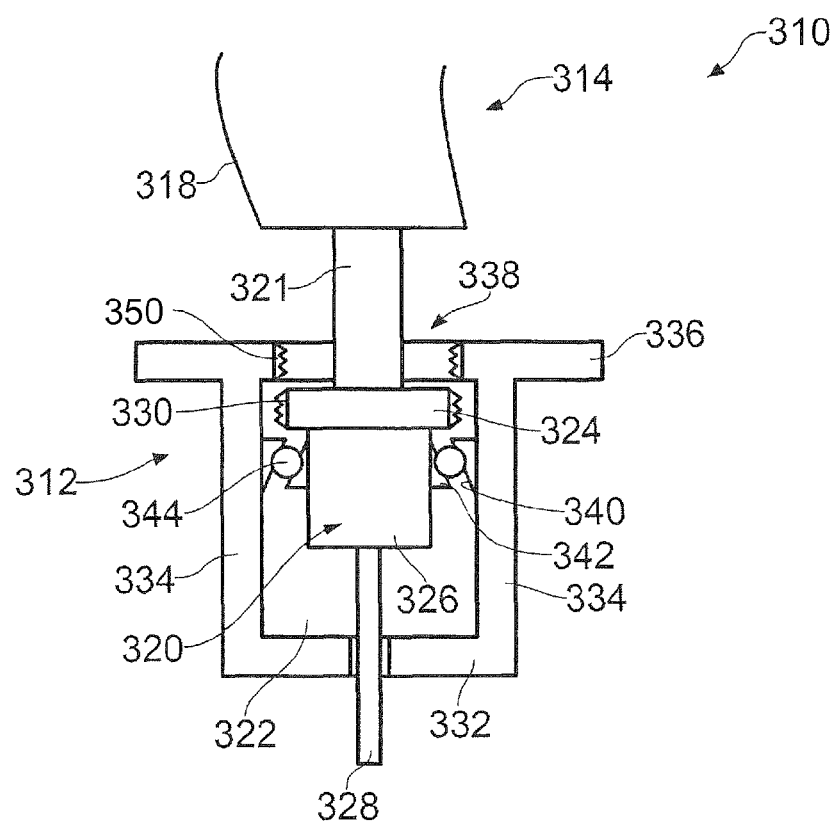
FIG. 3 shows a cross section of a blade assembly.

FIG. 3 shows a cross sectional representation of a blade assembly 310 according to the invention and which corresponds to either one of the propellers 223, 224 shown in FIG. 2. The blade assembly 310 includes a hub 312 and a blade 314.

The blade 314 includes an aerofoil portion 318 and a root 320 which are connected in coaxial series via a shaft 321 which lies along the blades longitudinal axis.

The root 320 is located within a retention cavity 322 of the hub 312 and includes in axial series extending from the shaft 321, a retention flange 324, body portion 326 and a pitch control shaft 328 which is rotatably connected to a pitch control actuator (not shown). The circumferential face of the retention flange 324 includes a threaded portion 330 which extends across the entirety of the circumferential face.

The hub 312 includes a radially inner wall 332, side walls 334 and a radially outer wall 336 which provides the outwards facing surface of the hub 312.

The root 320 is coupled to the hub 312 with a primary retention device, which, in the embodiment, is a bearing arrangement 344 located between two respective radially opposing faces 340, 342 of the hub 312 and root 320. The bearing arrangement 344 acts to provide support for the blade 314 such that it can rotate around the longitudinal axis of the blade 314 and also retains the blade root 320 within the hub 312 so as to prevent radial separation of the two components under the centrifugal force which is exerted during normal use of the engine.

The outer wall 336 of the hub includes a circular retention aperture 338 having a threaded circumferential face 350 which corresponds to the threaded circumferential face 330 of the retention flange 324. The threaded arrangement between the retention aperture 338 and retention flange 324 provides a secondary retention device in the form of an interlock which allows the root 320 to pass into the retention cavity 322 via a passageway in a way which prevents radial separation of the root and hub in the event of a primary retention device failure. Hence, the retention flange 324 and retention aperture 338 can be threadingly engaged such that the root 320 enters the retention cavity 322 by being screwed through the outer wall 336 of the retention cavity 322. Once inside the retention cavity 322, direct radial extraction is restricted due to the overlap of the retention aperture provided between the inner surface dimension of the hub thread 350 and the outer surface dimension of the retention flange thread 330.

With this arrangement there is provided a simple and effective secondary retention device which can be readily assembled and which does not require a skilled operator to assemble and which does not require any contact between the root 320 and hub 312 during normal use. Further, it is necessary for the secondary retention device to be installed before the primary device can be installed. Hence, engagement of the secondary retention device cannot be omitted. It will be understood that secondary should not be taken to mean a second to a primary retention device as there may well be others. Secondary should be taken to mean after the failure of a primary retention device, either alone, after, or in conjunction with other retention devices.

Figure 1:
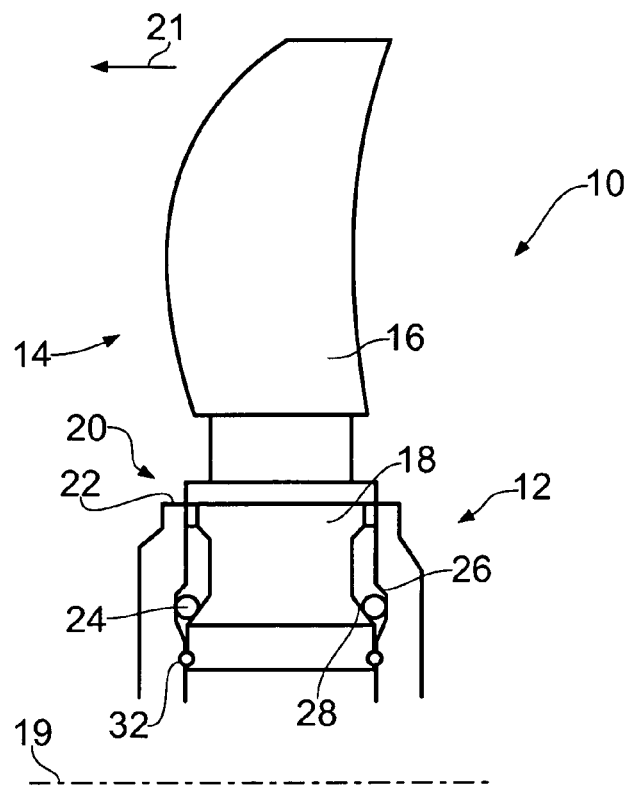
FIG. 1 shows a propeller assembly which utilises a known secondary retention device.
Figure 4:
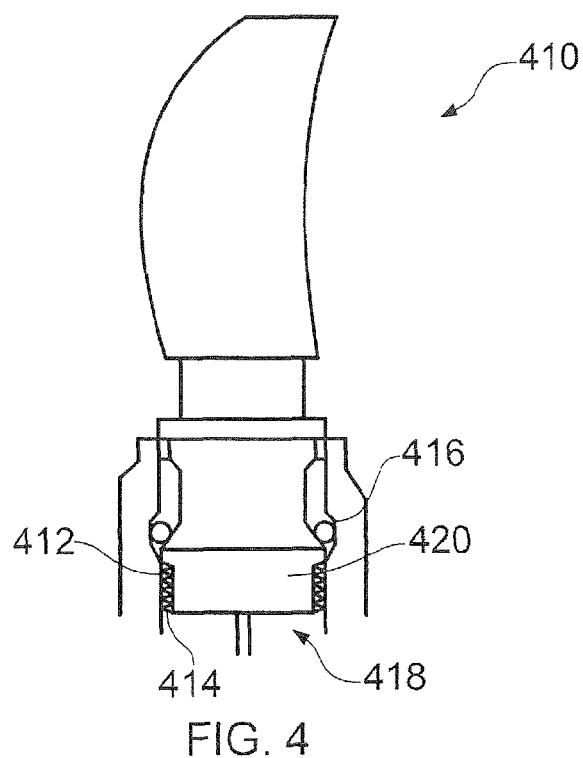
FIG. 4 shows a cross section of another blade assembly.

FIG. 4 shows an alternative embodiment of a blade assembly 410 in which a hub part 412 and a root part 414 are located radially inwards of the bearing arrangement 416 with respect to the principle axis of rotation (19, FIG. 1). As with the previous embodiment, the interlock between the hub 412 and root 414 parts are provided with mutually engaging threaded portions such that a retention aperture is provided in the hub which overlaps the root part 414. The lower side of the hub part 412 as viewed in the Figure defines a retention cavity 418 in which the root part 414 is suspended in normal use. In this embodiment, the construction of the hub part 412 and root part 414 are similar with the exception that the retention aperture of the hub part thread is machined from a flange located on a side wall of the hub, and the root part 414 is in the form of a thread which is machined out of a flange located on the root body portion 420.

The skilled person will appreciate that the dimensions of the retention flange 324 and aperture 338 can be made to provide some clearance so as to prevent problems associated with the relative movement between the two components. However, it will be preferable to keep the surfaces relatively close together such that the surfaces contact immediately after a bearing failure, thereby reducing impact between the two components to a minimum. Further, it may be preferable to allow enough separation so as to allow the root portion to move within the retention aperture during a primary retention device failure such that a detectable vibration is produced. This vibration could then be used as an indicator of a failure. A typical minimum clearance would be in the range of 1-3 mm depending on the particular arrangement.

It will also be appreciated that the size and number of threads will be determined in part by the maximum retention force required from the retention device. This in turn will be determined by the specific application and the configuration and operating requirements of the blade assembly and engine of which it is part. Hence, although the described embodiment includes multiple threads, this is not essential and there will be some applications for which a reduced number of threads can be employed. Further, it will be appreciated that the overlap between outer surface dimension of the root flange and hub aperture, that is the depth of the thread, and the material and dimensions of the root and hub part need to be sufficient to withstand the possible forces which may be exerted on the components in the event of a failure.

Figure 5:
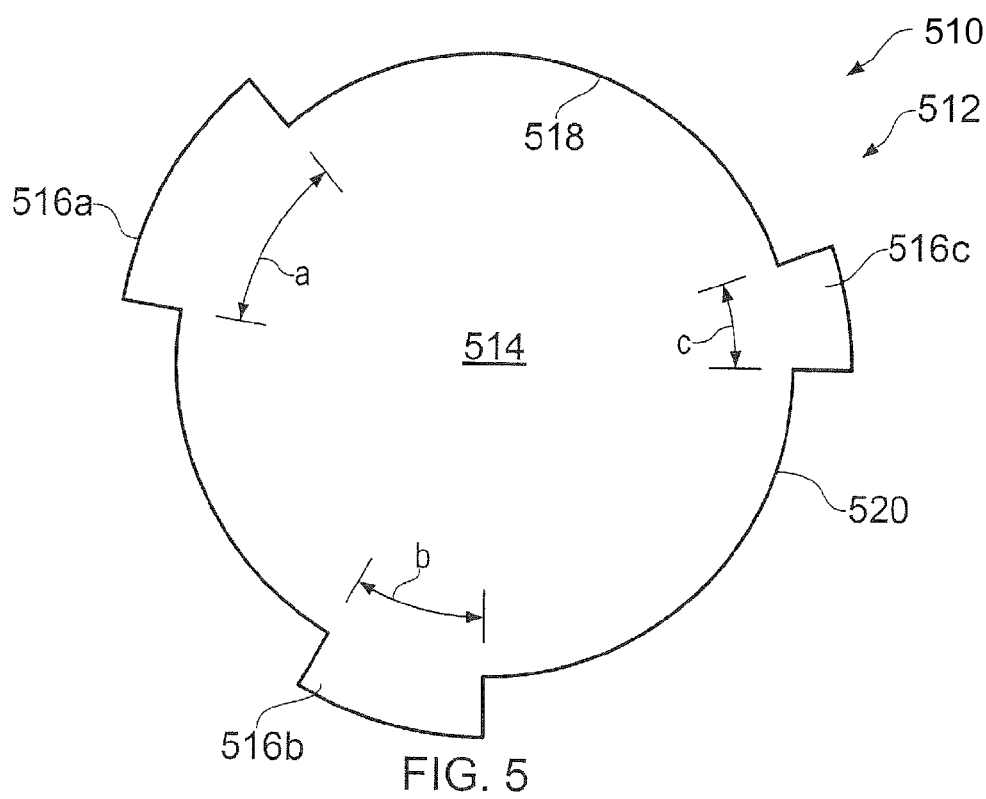
FIG. 5 shows a plan view of a retention aperture.
Figure 6:
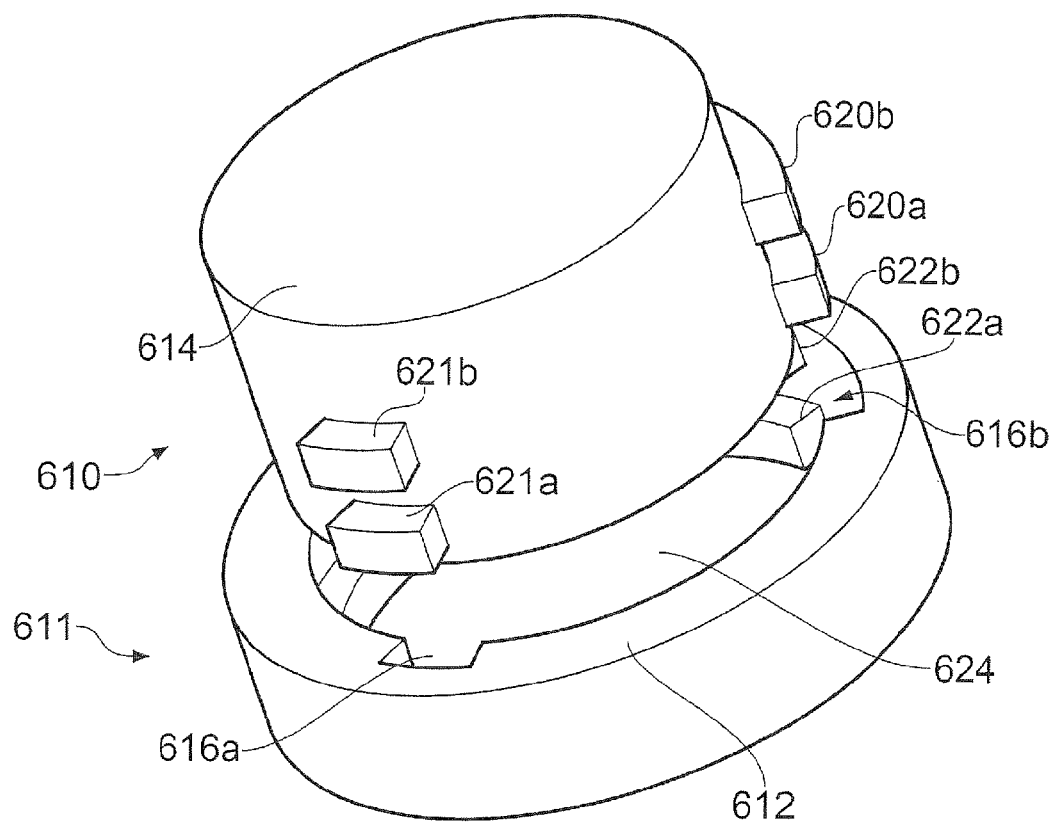
FIG. 6 shows a perspective view of another hub and root assembly
Figure 7:
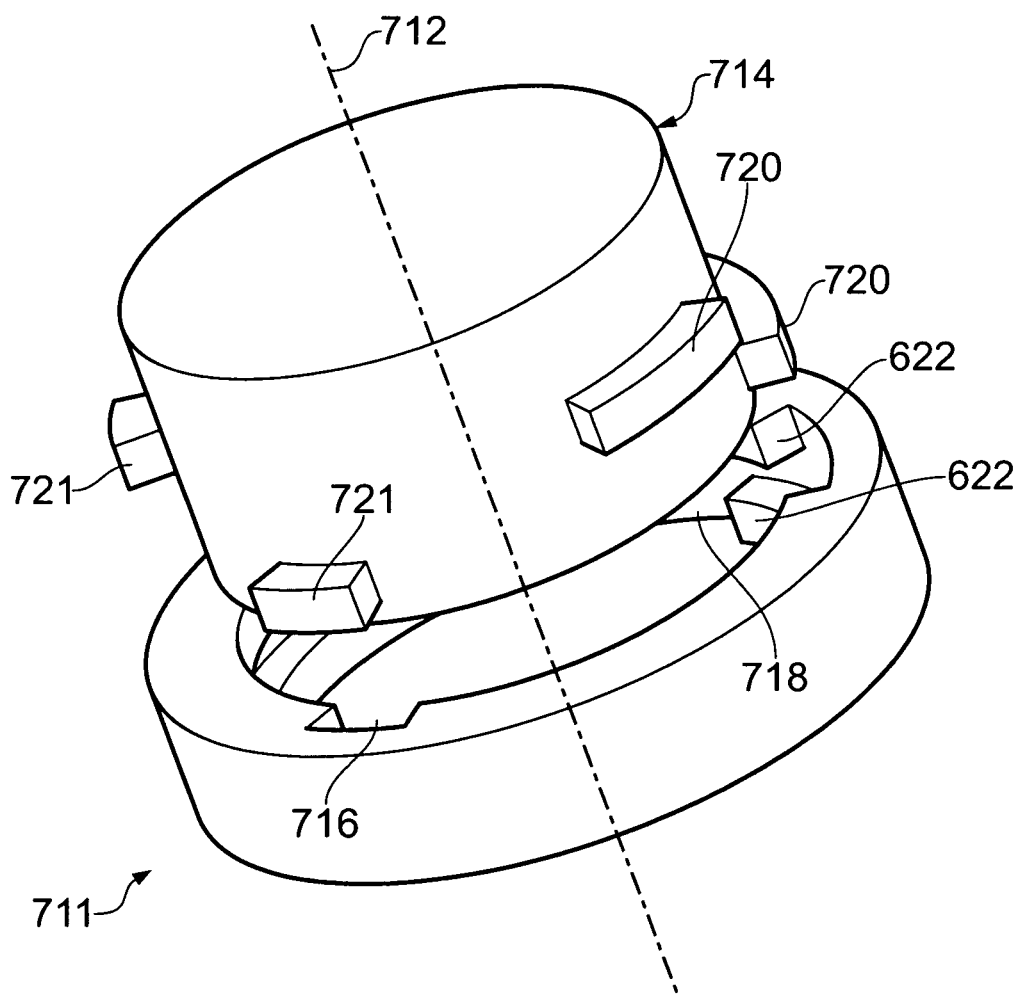
FIG. 7 shows a perspective view of yet another hub and root assembly.

FIGS. 5, 6 and 7 show another embodiment in which a bayonet interlock is used in place of the threaded interlock described above.

FIG. 5 shows a plan view of the hub 510 with a retention aperture 514 in the form of a circular bore in the outer wall 512 of the hub 510. The retention aperture 514 includes a plurality of arcuate cut outs 516a-c in the circumferential edge 518 of the outer wall 512 of the hub 510 so as to provide the aperture 514 with retention flanges 520 formed by the edge 518 between adjacent cutouts. In the given embodiment, there are three cut outs 516a-c, each one subtending a given angle, a, b, c respectively which is different from the other arcs.

FIG. 6 shows a root 610 having a root portion 614 with a plurality of projections in the form of lugs 620a, 620b, 621a, 621b. The lugs correspond to the cut outs 616a, 616b in the hub outer wall 612 as described above and shown further in FIG. 6. In the embodiment shown, there are two sets of radially separated lugs, 620a, 621a, and 620b, 621b and two corresponding radially separated retention flanges 622a, b which form a channel therebetween. The cut outs 616a, 616b and lugs 620a, 621a, and 620b, 621b are axially aligned so as to sit one above the other with respect to the longitudinal axis of the blade.

The cut outs 616a, 616b define an interlock passage which provides a path way for the projections to enter the retention cavity 624. Thus, in use, the root part 614 is manually maneuvered into the hub outer wall 612 with the lugs 620a, 621a, and 620b, 621b and cut outs 616a, 616b aligned. Once inserted to the correct depth, the root part 614 and hub part 611 are rotated relative to one another such that the upper lugs 621b and 620b are located in the channel defined by the upper and lower retention flanges 622a and 622b, and the lower lugs 620a and 621a are located below the lower retention flange 622a. In this way, the lugs 620a, 621a, and 620b, 621b are located in the retention cavity 624 of the hub part 611. Once within the retention cavity 624, the blade and root part can be rotated to a desired angle and the remainder of the assembly, which may include insertion of the primary retention device (not shown) incorporated. Although the aerofoil portion of the blade is not shown in FIG. 6, it will be appreciated that they would be present in reality.

Generally, the number, position and length of the cut outs will depend on the particular load they are designed to take in the event of a failure of a primary retention device failure and the rotational range required in operation. Hence, in the embodiment shown in FIGS. 5 and 6, there are multiple cut outs of different sizes. This arrangement provides a particular distribution of force as determined by a number of factors.

The first significant factor is the rotational range required to adjust the blade pitch for normal use. This will typically be a range of approximately 90 degrees to move the blade between the so-called feathered to fine positions, but may include a larger range if reverse thrusting is required. The second factor is the magnitude of the centrifugal force that will act on the blade in the event of a failure of the primary retention device. The third factor is the position that the blade will come to rest in during a failure. This position is largely dependent on the shape and mass distribution of the blade which determines the centrifugal turning moment and aerodynamic load and thus the resting position. Other factors which may affect the resting position may be extraneous features such as a stop which prevents rotation of the blade. A stop may be in the form of a projection or pillar which extends from a suitable location on the hub part or root part, or other appropriate location.

In the embodiment shown in FIG. 5, three cut outs 516a-c are approximately equidistantly spaced around the retention aperture 514, each having a different angular length, a, b and c, where a=40 degrees, b=30 degrees and c=20 degrees. Having varying lengths allows the overlap between the lugs and retention flanges to be larger than if the lugs and cut outs are equally sized. It is also advantageous as the engagement loading between the lugs and retention flanges can be distributed around the circumference of the retention aperture as required. Further engagement can be achieved by having a plurality of radially separated lugs 620a, 621a, and 620b, 621b as shown in FIG. 6.

An alternative arrangement which is advantageous for distributing the engagement load around the circumference of the retention aperture is shown in FIG. 7. Here, the axially separated lugs 720, 721 are circumferentially misaligned with respect to the longitudinal axis of the blade. In this way, the secondary retention device can have an engagement which is distributed around the circumference of the root portion so as to allow for an asymmetric centrifugal loading during a failure. The assembly of this arrangement is similar to that described for the assembly shown in FIG. 6. However, instead of inserting the root part 714 directly into the hub part 711 when the lugs 720, 721 and cut outs 716, 718 are aligned, the first lugs are inserted into and rotated through the channel defined by the retention flanges 622 before being inserted through the second, axially inner set of cut outs 718.

As with the threaded embodiment, the size of the lugs will depend ultimately on the force which they will experience during a failure of the primary retention device. However, projections which extend from the respective hub or root part will likely be in the order of a few millimeters depending on the engagement surface that is achieved between the root and hub parts.

The blade described in the above embodiments is a propeller for an open rotor gas turbine engine. This may be a conventional metal blade made from titanium say, or a composite blade, the construction of both being well known in the art. In each case the root and hub can be made from Titanium, Steel and Aluminum which are well known in the art. As will be appreciated by the skilled person, the secondary retention features may be integrally formed with the root and hub sections with the threads formed in the appropriate places by machining.

The invention claimed is:

1. A blade assembly comprising:
a hub which is rotatable about an axis;
at least one blade having an aerofoil portion and a root, wherein the root is coupled to the hub using a primary retention device which prevents radial separation of the root and hub in normal use while supporting the at least one blade for rotation about a longitudinal axis of the at least one blade relative to the hub; and,
a secondary retention device having a root part and a hub part, the root part being located radially inwards of the hub part in a retention cavity in use,
wherein at least a portion of the root part enters the retention cavity via an interlock which prevents radial separation of the root and hub in the event of a primary retention device failure.

2. A blade assembly as claimed in claim 1 wherein the interlock comprises a retention aperture which overlaps a portion of the hub part when in normal use.

3. A blade assembly as claimed in claim 1 wherein the interlock requires the blade to be rotated approximately about the longitudinal axis of the blade to pass into the retention cavity.

4. A blade assembly as claimed in claim 1 wherein the root portion includes a projection and the interlock includes a passageway through which the projection can pass.

5. A blade assembly as claimed in claim 4 wherein the passageway includes at least one key slot in a circumferential edge of a retention aperture and the root part includes a projection which corresponds to the key slot.

6. A blade assembly as claimed in claim 5 wherein the passageway includes at least two radially separated retention apertures and the root part includes at least two radially separated projections.

7. A blade assembly as claimed in claim 6 wherein the radially separated projections are axially aligned with respect to the longitudinal axis of the blade.

8. A blade assembly as claimed in claim 6 wherein the radially separated projections are axially asymmetrical so as to provide a distributed overlap between the projections and the respective retention apertures when in use.

9. A blade assembly as claimed in claim 1 wherein the interlock comprises a retention aperture which overlaps a portion of the hub part when in normal use, and
wherein the retention aperture comprises a threaded portion which corresponds to a threaded portion on the root part.

10. A blade assembly as claimed in claim 1 wherein the root part is suspended within the retention cavity in normal use.

11. A blade assembly as claimed in claim 1 wherein the interlock is radially inwards of the primary retention device with respect to the rotational axis of the blade assembly.

12. A blade assembly as claimed in claim 1 wherein the interlock is radially outwards of the primary retention device.

13. A blade assembly as claimed in claim 1 configured such that the primary retention device can only be engaged once the root part has entered the retention cavity via the interlock.

14. A blade assembly as claimed in claim 1 wherein the configurations of the root part and the hub part correspond to provide the interlock.

15. A method of manufacturing a blade assembly comprising: a hub which is rotatable about an axis; at least one blade having an aerofoil portion and a root, wherein the root is coupled to the hub using a primary retention device which prevents radial separation of the root and hub in normal use while supporting the at least one blade for rotation about a longitudinal axis of the at least one blade relative to the hub; and, a secondary retention device having a root part and a hub part, the root part being located radially inwards of the hub part in a retention cavity in use, wherein at least a portion of the root part enters the retention cavity via an interlock which prevents radial separation of the root and hub in the event of a primary retention device failure, the method comprising the steps of:
presenting the root part to the interlock;
passing the root portion through the interlock so that it resides within the retention cavity in normal use;
engaging a primary retention device.

16. A method as claimed in claim 15 wherein passing the root portion through the interlock comprises rotating the root part about the approximate longitudinal axis of the blade.

17. A method as claimed in claim 15 wherein the configurations of the root part and the hub part correspond to provide the interlock.

* * * * *